: 3,150,007
PROCESS FOR CLEANING STONE
Julius M. Kovachy, 12329 Fairhill, Cleveland, Ohio
No Drawing. Filed Aug. 2, 1954, Ser. No. 447,415
7 Claims. (Cl. 134—4)

My invention appertains to processes for cleaning stone and is particularly useful for removing dirt, discolorations and other foreign matter that ordinarily accumulates in a surface film on the surface of stone and brick buildings, tombstones, and stone articles generally, discoloring and darkening the same on account of the superficial deposits most often derived from the air or rain, or both.

It is commonly known that certain acids, or acid compositions, including free hydrofluoric acid in solution, have been found useful for stone cleaning. However, the most efficient of such compositions are dangerous to the persons applying the same, and require expensive protective measures for such persons when used, due to the poisonous and other harmful effects to health and clothing, at the same time being costly and otherwise disadvantageous.

Stone, both natural and artificial, generally contains silicates or carbonates, and it is an essential object of my invention to provide a method of using a composition which when applied to the stone generates small quantities of nascent hydrofluoric acid in water and this acid when it reacts with the above materials of the stone produces an efficient cleaning effect on the stone, without harmful effects upon health or clothing of the user of the composition.

To the above end I provide a novel method of using a composition wherein the ingredients of the composition are proportioned such that when the composition is employed in stone cleaning operations, a controlled action of the same is obtained by which the amount of free hydrofluoric acid in water solution produced affects a microscopic film of the stone surface to afford immediate desired chemical reaction with the silicates or carbonates in the stone so as to loosen the dirt and foreign matter accumulated thereon. Dislodgement and removal of the said matter along with the residue of the composition is then obtained by final washing of such surface. Of great importance I have found that such controlled action in no way produces an excess of the acid such as might have deleterious effects respecting the person or clothing of the user handling the cleaning composition for processing the cleaning operation.

The great affinity of free hydrofluoric acid for stone of different kinds, and the instant production or generation of more of the acid by the salts present in the composition as it is dissipated in contact with the stone makes the above possible.

Still another object of my invention is to provide a method of using a composition of the character described that may readily be applied to the surface of the stone to be cleaned much after the manner of painting, by brush or in the form of a spray, and readily rinsed off with a fluid such as water or steam after remaining applied to the surface a short period of time, the rinsing wash carrying with it the incrustations and foreign matter, removal of which is sought.

Still another objective in view respecting my invention has been to provide a method of using a composition of the nature set forth, which is composed of ingredients largely of relatively low cost, so that the expense incidental to using the composition for cleaning of the facing stone of buildings is relatively low, as compared with acid treatments heretofore availed of in this art. The foregoing is of great importance having in mind that large amounts of the compounded materials of the invention are necessarily required for cleaning buildings particularly, and the cost factor frequently renders the use of known prior highly effective acid cleaning compositions prohibitive aside from the danger of their employment.

I have found that my composition herein described is especially efficient in cleaning sandstone (one of the most difficult stones to be cleaned owing to its porous structure), as well as the common stones, marble, granite, and artificial stone such as brick and tile, and those made from Portland cement and aggregate materials.

My invented composition is made up of (1) ammonium bifluoride; (2) sodium bisulphate; (3) barium sulphate; (4) gum arabic; and water.

The ammonium bifluoride is the basic material because it is the source of the free hydrofluoric acid dissolved in water.

The sodium bisulphate in solution contains an acid radical which in combination with the acid fluoride changes the ion concentrations in the solution to form a greater concentration of hydrofluoric acid. In the use of the composition when the nascent free hydrofluoric acid contacts the stone it is quickly used up. The ensuing inbalance is instantly corrected by the formation of a like further amount of free acid. In this manner a constant proportion of active free hydrofluoric acid is generated in the material applied to the surface of the stone, quite sufficient for action of the acid on the stone to give desired loosening of the incrusted dirt and foreign matter thereon, and yet insufficient always during any given period to affect in any deleterious manner the person (skin, etc.) or clothing of the user of the compound.

The reaction formula of active salts of the ingredients employed as above is as follows:

$2NH_4FHF + 2NaHSO_4 = NH_4FHF$
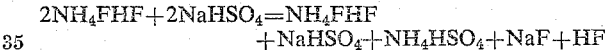
$+ NaHSO_4 + NH_4HSO_4 + NaF + HF$

Now in the use of my composition the barium sulphate is an inert material serving a three-fold purpose, viz.: first, it acts as a filler to give body to the compound so that it will spread like paint, when applied to the stone surface; second, it serves as a carrier for the solution of active salts to allow a relatively large supply of the solution to be spread over a given area; and third its addition thus accelerates the efficient cleaning action of the compound on the stone, reducing the time required.

The water is the solvent for the salts generating the active reagent, free hydrofluoric acid, and is a vehicle for them.

The gum arabic employed acts as a binder of the several ingredients, creates suitable viscosity for the mass and renders it homogeneous in texture; the latter property enables the mass to adhere uniformly to the surface to which it is applied.

The preferred proportions of the ingredients of my compound, by weight, are:

| | Percent |
|---|---|
| Ammonium bifluoride | 26 |
| Water | 22 |
| Gum arabic | 11 |
| Sodium bisulphate | 7 |
| Barium sulphate | 34 |

When the ingredients as above proportioned are admixed, a paste of a consistency approximating that of paint is formed and may be applied to the stone by brushing or spraying thereon.

The composition, in reacting with the stone, penetrates through the dirt and surface incrustations to the surface of the stone upon which it is adhered. The minute quantity of hydrofluoric acid in the composition reacts with the silicates or carbonates of the stone affecting a microscopic surface film thereof, which phenomenon causes the dirt and/or foreign matter on the stone's surface to be loosened.

After a few minutes, the period depending somewhat on how heavy is the incrustation to be cleaned off, the mass of composition is washed off with a fluid or vapor such as water or steam and it is found that in this manner the dirt, grime or other foreign matter on the stone are completely removed and the surface treated is perfectly cleaned and restored to its original color or condition.

In lieu of gum arabic there may be used a binder of dextrine, tragacanth, casein, or like substance, viscous when dissolved in water.

The employment of my composition and process, as described above, will in no way injure the stone treated.

I claim:

1. The process of cleaning stone, which includes preparing a mixture of ammonium bifluoride, sodium bisulphate, and water, proportioned to produce a small amount of free hydrofluoric acid in stable solution and so constituted that as the originally produced free hydrofluoric acid is dissipated more is regenerated in nascent form and in like amount sufficient to affect a microscopic film of the surface to which it is applied to loosen surface incrustation of dirt and foreign matter therefrom, applying said mixture to the surface of the stone, maintaining the mixture in intimate contact with the stone to produce a chemical reaction with the surface of the stone affecting a microscopic film thereon to loosen foreign matter adhering thereto, and then washing the stone to remove the mixture compound and said foreign matter.

2. The process of cleaning stone having incrustation of dirt or foreign matter upon the surface thereof, which includes preparing a mixture of ammonium bifluoride, sodium bisulphate, an inert salt acting as a filler or body, and a binder, proportioned to produce a small amount of free hydrofluoric acid in stable solution and so constituted that as the originally produced free hydrofluoric acid is dissipated more is regenerated in nascent form and in like amount sufficient to affect a microscopic film of the surface to which it is applied to loosen surface incrustation of dirt and foreign matter therefrom, applying said mixture to the surface of the stone bearing said incrustation to produce a chemical reaction with the surface of the stone effecting a microscopic film thereon so as to loosen the adhering incrustation, and then applying a wash to the stone to carry off the residual mixture compound and incrustation of dirt and foreign matter.

3. The art of cleaning stone which consists of generating nascent hydrofluoric acid in water solution, of sufficient quantity maintained in contact with the surface of the stone for a short period, by means of a water solution of harmless salts including ammonium bifluoride and sodium bisulphate proportioned to produce a small amount of free hydrofluoric acid in stable solution and so constituted that as the originally produced free hydrofluoric acid is dissipated more is regenerated in nascent form and in like amount sufficient to affect a microscopic film of the surface to which it is applied to loosen surface incrustation of dirt and foreign matter therefrom, and then washing the stone to remove said solution and incrustations on the said surface which are freed by the named acid.

4. The art of cleaning stone, as claimed in claim 3 wherein the solution has approximately the consistency of paint enabling applications by brushing or spraying action.

5. The art of cleaning stone which includes applying to the surface of the stone an admixture of ammonium bifluoride, sodium bisulphate and water, proportioned and of a viscosity conditioning the solution to produce nascent free hydrofluoric acid affecting a microscopic film of the surface of the stone, and thereafter washing said compound from the surface of the stone for displacing the compound and carrying off with it any surface incrustation loosened by the hydrofluoric acid.

6. The process of cleaning stone having incrustation of dirt or foreign matter upon the surface thereof, which includes preparing a mixture of ammonium bifluoride, sodium bisulphate, an inert salt acting as a filler or body, a viscous binder, and water, proportioned to produce a small amount of free hydrofluoric acid in stable solution and so constituted that as the originally produced free hydrofluoric acid is dissipated more is regenerated in nascent form and in like amount sufficient to affect a microscopic film of the surface to which it is applied to loosen surface incrustation of dirt and foreign matter therefrom, said mixture having a homogeneous texture and suitable viscosity enabling it to adhere uniformly to the surface of stone, applying said composition to such surface, and then removing the residual composition and loosened incrustation of dirt and foreign matter from such surface.

7. The process of cleaning stone, which includes preparing a mixture of ammonium bifluoride, sodium bisulphate, and water, proportioned to produce a small amount of free hydrofluoric acid in stable solution and so constituted that as the originally produced free hydrofluoric acid is dissipated more is regenerated in nascent form and in like amount sufficient to affect a microscopic film of the surface to which it is applied to loosen surface incrustation of dirt and foreign matter therefrom, applying said mixture to the surface of the stone, maintaining the mixture in intimate contact with the stone to produce a chemical reaction with the surface of the stone affecting a microscopic film thereon so as to loosen foreign matter adhering thereto, and then removing the residual mixture compound and said foreign matter.

References Cited in the file of this patent

UNITED STATES PATENTS

| | | |
|---|---|---|
| 208,441 | Varns | Sept. 24, 1878 |
| 1,016,928 | Bishop | Feb. 13, 1912 |
| 1,335,171 | McAdam | Mar. 30, 1920 |
| 1,428,084 | Gravell | Sept. 5, 1922 |
| 1,471,466 | Hageman et al. | Oct. 23, 1923 |
| 1,556,248 | Ohlwiler | Oct. 6, 1925 |
| 1,574,407 | Nelson | Feb. 23, 1926 |
| 1,865,948 | Nutt | July 5, 1932 |
| 2,118,386 | Swinehart | May 24, 1938 |
| 2,365,153 | Stevens | Dec. 19, 1944 |
| 2,558,013 | Staubly | June 26, 1951 |
| 2,606,566 | Tarnopol | Aug. 12, 1952 |
| 2,614,913 | Reindl | Oct. 21, 1952 |
| 2,656,289 | Miller | Oct. 20, 1953 |
| 2,714,094 | McNally | July 26, 1955 |

FOREIGN PATENTS

| | | |
|---|---|---|
| 723,823 | Germany | Aug. 11, 1942 |